United States Patent
Mizuno et al.

(10) Patent No.: US 10,224,148 B2
(45) Date of Patent: *Mar. 5, 2019

(54) MULTI-LAYER CERAMIC CAPACITOR AND METHOD OF PRODUCING THE SAME

(71) Applicant: Taiyo Yuden Co., Ltd., Tokyo (JP)

(72) Inventors: Kotaro Mizuno, Tokyo (JP); Yukihiro Konishi, Tokyo (JP); Yoichi Kato, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/008,260

(22) Filed: Jun. 14, 2018

(65) Prior Publication Data

US 2018/0294104 A1    Oct. 11, 2018

Related U.S. Application Data

(63) Continuation of application No. 15/390,090, filed on Dec. 23, 2016, now Pat. No. 10,020,117.

(30) Foreign Application Priority Data

Feb. 18, 2016   (JP) .................................. 2016-028837
Aug. 1, 2016    (JP) .................................. 2016-151065

(51) Int. Cl.
*H01G 4/30* (2006.01)
*H01G 4/12* (2006.01)
(Continued)

(52) U.S. Cl.
CPC ........... *H01G 4/308* (2013.01); *H01G 4/1227* (2013.01); *H01G 4/1236* (2013.01); *H01G 4/232* (2013.01);
(Continued)

(58) Field of Classification Search
CPC ...... H01G 4/308; H01G 4/1227; H01G 4/248; H01G 4/1236; H01G 4/30
See application file for complete search history.

(56) References Cited

U.S. PATENT DOCUMENTS 9,812,259 B2   11/2017  Lee et al.
9,812,261 B2   11/2017  Fukunaga et al.
(Continued)

FOREIGN PATENT DOCUMENTS

JP   2012-209539 A   10/2012

*Primary Examiner* — Dion Ferguson
(74) *Attorney, Agent, or Firm* — Saliwanchik, Lloyd & Eisenschenk

(57) ABSTRACT

A multi-layer ceramic capacitor includes a multi-layer unit, a side margin, and a bonding unit. The multi-layer unit includes ceramic layers and internal electrodes. The ceramic layers are made of first ceramics and laminated in a first direction, the first ceramics having a first average crystal grain diameter. The internal electrodes are disposed between the ceramic layers. The side margin is made of second ceramics and covers the multi-layer unit from a second direction orthogonal to the first direction, the second ceramics having a second average crystal grain diameter. The bonding unit is made of third ceramics and disposed between the multi-layer unit and the side margin, the third ceramics having a third average crystal grain diameter that is larger than the first average crystal grain diameter and the second average crystal grain diameter.

3 Claims, 10 Drawing Sheets

(51) Int. Cl.
*H01G 4/248* (2006.01)
*H01G 4/232* (2006.01)

(52) U.S. Cl.
CPC ............... *H01G 4/248* (2013.01); *H01G 4/30* (2013.01); *H01G 4/12* (2013.01)

(56) References Cited

U.S. PATENT DOCUMENTS

| | | | |
|---|---|---|---|
| 10,020,117 B2* | 7/2018 | Mizuno | ............... H01G 4/308 |
| 2008/0266751 A1* | 10/2008 | Yamazaki | ........... C04B 35/4682 |
| | | | 361/321.4 |
| 2012/0075770 A1* | 3/2012 | Banno | ................... B82Y 30/00 |
| | | | 361/321.4 |
| 2012/0154978 A1 | 6/2012 | Kim | |
| 2012/0262840 A1 | 10/2012 | Koizumi | |
| 2014/0301013 A1 | 10/2014 | Kim | |
| 2015/0340155 A1 | 11/2015 | Fukunaga et al. | |
| 2017/0133157 A1 | 5/2017 | Fukunaga et al. | |
| 2017/0148572 A1 | 5/2017 | Fukunaga et al. | |

* cited by examiner

MULTI-LAYER CERAMIC CAPACITOR AND METHOD OF PRODUCING THE SAME

CROSS-REFERENCE TO RELATED APPLICATIONS

This application is a continuation of U.S. application Ser. No. 15/390,090, filed Dec. 23, 2016, which claims priority under 35 U.S.C. § 119 to Japanese Patent Application Nos. 2016-028837, filed Feb. 18, 2016; and 2016-151065, filed Aug. 1, 2016, which are herein incorporated by reference in their entirety.

BACKGROUND

The present invention relates to a multi-layer ceramic capacitor including side margins provided in a subsequent step, and to a method of producing the multi-layer ceramic capacitor.

Along with miniaturization and achievement of high performance of electronic devices, there have recently been increasingly strong demands for miniaturization, increase in capacity, ensuring of reliability, and the like with respect to multi-layer ceramic capacitors used in the electronic devices. In order to meet those demands, it is effective to enlarge internal electrodes of the multi-layer ceramic capacitor, for example. In order to enlarge the internal electrodes, it is necessary to thin side margins for ensuring insulation properties of the periphery of the internal electrodes.

Meanwhile, in a general method of producing a multi-layer ceramic capacitor, it is difficult to form side margins having a uniform thickness because of precision in each step (e.g., patterning of internal electrodes, cutting of a multi-layer sheet, etc.). Thus, in such a method of producing a multi-layer ceramic capacitor, as the side margins are made thinner, it is more difficult to ensure insulation properties of the periphery of the internal electrodes.

Japanese Patent Application Laid-open No. 2012-209539 discloses a technique of providing side margins in a subsequent step. In other words, in this technique, a multi-layer chip including internal electrodes exposed to side surfaces of the multi-layer chip is produced, and side margins are then provided to the side surfaces of the multi-layer chip. This makes it possible to form side margins having a uniform thickness, and to ensure insulation properties of the periphery of the internal electrodes also when the side margins are made thinner.

BRIEF SUMMARY

The technique disclosed in Japanese Patent Application Laid-open No. 2012-209539 provides a multi-layer chip by pressure-bonding laminated ceramic layers to one another by hydrostatic pressing, uniaxial pressing, or the like. In the multi-layer chip, due to a pressing force applied to the side surfaces from which the internal electrodes are exposed, the ceramic layers are easily peeled off from one another. Thus, the side margins are attached to the side surfaces of the multi-layer chip such that a strong pressing force is not applied to the side surfaces.

As a result, before sintering, the side margins tend to have a lower density than the multi-layer chip. A difference in density between the multi-layer chip and the side margins causes a difference in shrinkage behavior at sintering between the multi-layer chip and the side margins. This may lead to occurrence of cracks and peel-off of the multi-layer chip and the side margins and also reduction in reliability, particularly, in durability in high-temperature and moisture-resistance tests.

In view of the circumstances as described above, it is desirable to provide a multi-layer ceramic capacitor and a method of producing the multi-layer ceramic capacitor that are capable of providing high bonding properties of side margins.

According to an embodiment of the present invention, there is provided a multi-layer ceramic capacitor including a multi-layer unit, a side margin, and a bonding unit.

The multi-layer unit includes ceramic layers that are made of first ceramics and laminated in a first direction, the first ceramics having a first average crystal grain diameter, and internal electrodes disposed between the ceramic layers.

The side margin is made of second ceramics and covers the multi-layer unit from a second direction orthogonal to the first direction, the second ceramics having a second average crystal grain diameter.

The bonding unit is made of third ceramics and disposed between the multi-layer unit and the side margin, the third ceramics having a third average crystal grain diameter that is larger than the first average crystal grain diameter and the second average crystal grain diameter.

With this configuration, the bonding unit is made of third ceramics having the third average crystal grain diameter larger than the first average crystal grain diameter and the second average crystal grain diameter. This reduces the number of crystal grains being in contact with the multi-layer unit and the side margin in both interfaces of the bonding unit. In other words, in both the interfaces of the bonding unit, there are a small number of crystal grain boundaries that are likely to be the origins from which cracks and peel-off of the multi-layer unit and the side margin are generated. Thus, a good bonding state between the multi-layer unit and the side margin is maintained via the bonding unit.

The bonding unit may have a thickness of 5 µm or less.

By the suppression of the thickness of the bonding unit to 5 µm or less, the influence of the bonding unit on the form and performance of the multi-layer ceramic capacitor can be made small.

The first ceramics, the second ceramics, and the third ceramics may each include polycrystal of a common composition system.

With this configuration, when the unsintered body including the bonding unit, the multi-layer chip, and the side margin is sintered, the shrinkage behaviors of the multi-layer chip, the side margin, and the bonding unit are made uniform.

Thus, generation of cracks and peel-off of the multi-layer unit and the side margin can be inhibited from occurring in both the interfaces of the sintered bonding unit.

According to another embodiment of the present invention, there is provided a method of producing a multi-layer ceramic capacitor, the method including: preparing an unsintered multi-layer chip including ceramic layers that include a main component of first ceramics and are laminated in a first direction, the first ceramics having a first average particle diameter, and internal electrodes disposed between the ceramic layers; producing a body by providing a side margin to a side surface of the multi-layer chip via a bonding unit, the side margin including a main component of second ceramics having a second average particle diameter, the side surface being oriented in a second direction orthogonal to the first direction, the bonding unit including a main component of third ceramics having a third average particle diameter that is smaller than the first average particle diameter and the second average particle diameter; and sintering the body.

With this configuration, particles of the third ceramics are easy to enter pores or the like of the first ceramics and the second ceramics. Thus, in the unsintered body, adhesion between the multi-layer chip and the side margin via the bonding unit is improved.

Further, the bonding unit includes a main component of ceramics having the third average particle diameter, and is thus flexibly deformable. Thus, the bonding unit is freely deformable in accordance with the shrinkage behaviors of the multi-layer chip and the side margin. As a result, even when the multi-layer chip and the side margin have a difference in level of shrinkage at the sintering, the multi-layer chip and the side margin do not apply stress mutually.

Thus, cracks and peel-off of the multi-layer unit and the side margin can be inhibited from occurring in both the interfaces of the sintered bonding unit.

The sintering the body may include making an average crystal grain diameter of the bonding unit larger than an average crystal grain diameter of the ceramic layers and the side margin.

With this configuration, the number of crystal grains being in contact with the multi-layer unit and the side margin is reduced in both interfaces of the sintered bonding unit. In other words, both the interfaces of the bonding unit have a reduced number of crystal grain boundaries that are likely to be the origins from which cracks and peel-off of the multi-layer unit and the side margin are generated. Thus, a good bonding state between the multi-layer unit and the side margin is maintained via the bonding unit.

According to another embodiment of the present invention, there is provided a multi-layer ceramic capacitor including a multi-layer unit, a side margin, a bonding unit, and a ridge.

The multi-layer unit includes ceramic layers that are made of first ceramics and laminated in a first direction, the first ceramics having a first average crystal grain diameter, and internal electrodes disposed between the ceramic layers.

The side margin is made of second ceramics and covers the multi-layer unit from a second direction orthogonal to the first direction, the second ceramics having a second average crystal grain diameter.

The bonding unit is made of third ceramics and disposed between the multi-layer unit and the side margin, the third ceramics having a third average crystal grain diameter that is larger than the first average crystal grain diameter and the second average crystal grain diameter.

The ridge includes a curved surface over the multi-layer unit, the bonding unit, and the side margin.

According to another embodiment of the present invention, there is provided a method of producing a multi-layer ceramic capacitor, the method including: preparing an unsintered multi-layer chip including ceramic layers that include a main component of first ceramics and are laminated in a first direction, the first ceramics having a first average particle diameter, and internal electrodes disposed between the ceramic layers; producing a body by providing a side margin to a side surface of the multi-layer chip via a bonding unit, the side margin including a main component of second ceramics having a second average particle diameter, the side surface being oriented in a second direction orthogonal to the first direction, the bonding unit including a main component of third ceramics having a third average particle diameter that is smaller than the first average particle diameter and the second average particle diameter; sintering the body; and performing barrel polishing on the body one of before the sintering and after the sintering, to form a ridge on the body, the ridge including a curved surface over the multi-layer unit, the bonding unit, and the side margin.

With this configuration, particles of the third ceramics are easy to enter pores or the like of the first ceramics and the second ceramics. Thus, in the unsintered body, adhesion between the multi-layer chip and the side margin via the bonding unit is improved.

Therefore, even when the ridge is formed on the unsintered body by the barrel polishing, cracks, delamination, and the like are inhibited from occurring in both of the interface between the bonding unit and the side margin and the interface between the bonding unit and the multi-layer chip.

Further, in the unsintered body, since adhesion between the multi-layer chip and the side margin via the bonding unit is improved, also in the sintered body, adhesion between the sintered multi-layer chip and bonding unit and between the sintered bonding unit and side margin are improved.

Therefore, even when the sintered body is subjected to the barrel polishing and the ridge is then formed, cracks, delamination, and the like are inhibited from occurring in both of the interface between the sintered bonding unit and side margin and the interface between the sintered bonding unit and multi-layer chip.

It is possbile to provide a multi-layer ceramic capacitor and a method of producing the multi-layer ceramic capacitor that are capable of providing high bonding properties of side margins.

These and other objects, features and advantages of the present invention will become more apparent in light of the following detailed description of embodiments thereof, as illustrated in the accompanying drawings.

DETAILED DESCRIPTION

Hereinafter, embodiments of the present invention will be described with reference to the drawings.

In the figures, an X axis, a Y axis, and a Z axis orthogonal to one another are shown as appropriate. The X axis, the Y axis, and the Z axis are common in all figures.

1. First Embodiment 1.1 Overall Configuration of Multi-layer Ceramic Capacitor 10

Figure 1:
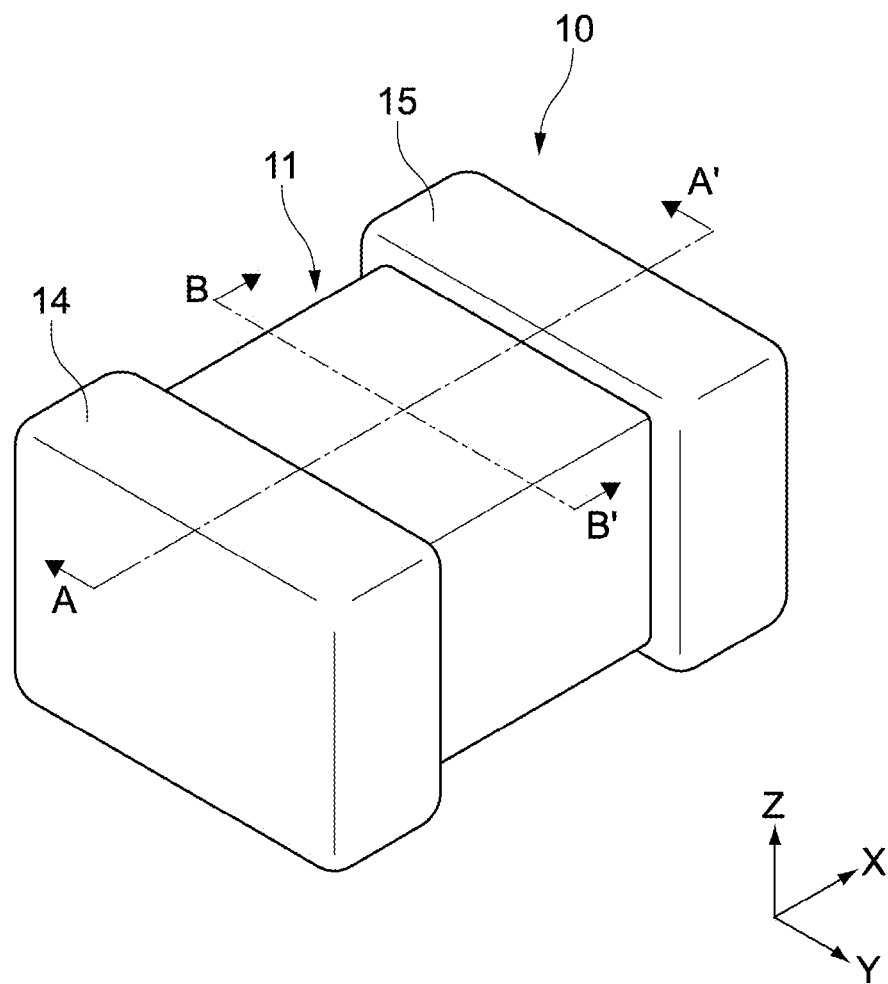
FIG. 1 is a perspective view of a multi-layer ceramic capacitor according to a first embodiment of the present invention.
Figure 2:
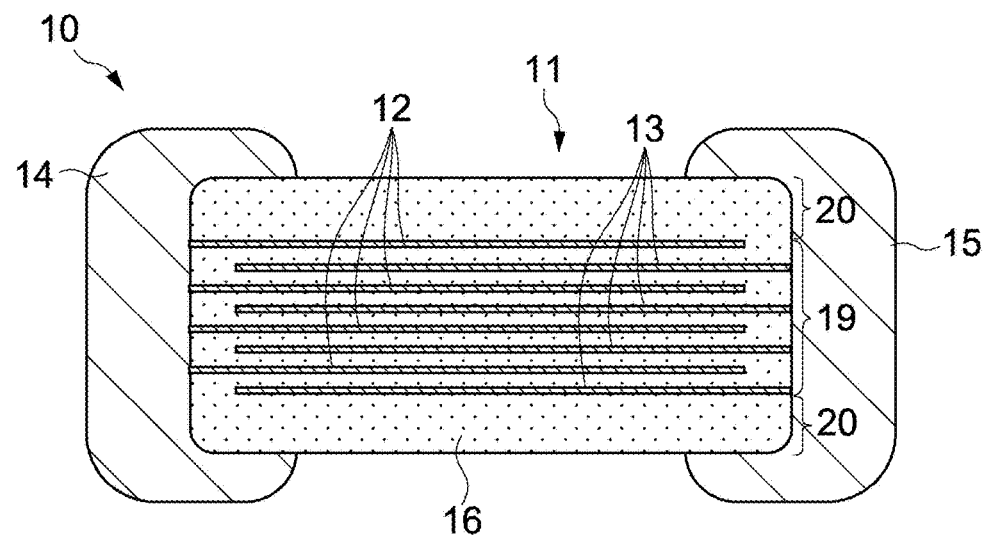
FIG. 2 is a cross-sectional view of the multi-layer ceramic capacitor taken along the A-A' line in FIG. 1.
Figure 3:
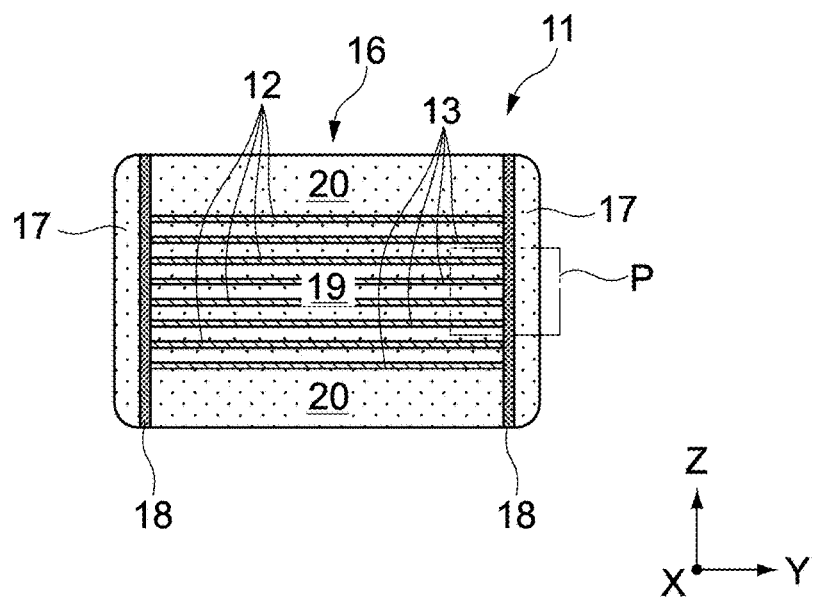
FIG. 3 is a cross-sectional view of the multi-layer ceramic capacitor taken along the B-B' line in FIG. 1.

FIGS. 1 to 3 each show a multi-layer ceramic capacitor 10 according to a first embodiment of the present invention. FIG. 1 is a perspective view of the multi-layer ceramic capacitor 10. FIG. 2 is a cross-sectional view of the multi-layer ceramic capacitor 10 taken along the A-A' line in FIG. 1. FIG. 3 is a cross-sectional view of the multi-layer ceramic capacitor 10 taken along the B-B' line in FIG. 1.

The multi-layer ceramic capacitor 10 includes a body 11, a first external electrode 14, and a second external electrode 15.

Typically, the body 11 has two side surfaces oriented in a Y-axis direction and two main surfaces oriented in a Z-axis direction. Ridges connecting the respective surfaces of the body 11 are chamfered. It should be noted that the form of the body 11 is not limited to the form as described above. For example, the surfaces of the body 11 may be curved surfaces, and the body 11 may be rounded as a whole.

The first external electrode 14 and the second external electrode 15 cover both end surfaces of the body 11 that are oriented in an X-axis direction, and extend to four surfaces that are connected to both the end surfaces oriented in the X-axis direction. With this configuration, both of the first external electrode 14 and the second external electrode 15 have U-shaped cross sections in parallel with an X-Z plane and an X-Y plane.

The body 11 includes a multi-layer unit 16, side margins 17, and bonding units 18.

The multi-layer unit 16 has a configuration in which a plurality of flat plate-like ceramic layers extending along the X-Y plane is laminated in the Z-axis direction.

The side margins 17 cover the entire areas of both the side surfaces of the multi-layer unit 16 that are oriented in the Y-axis direction. The bonding units 18 are each provided between the multi-layer unit 16 and each of the side margins 17. In other words, the side margins 17 are bonded to both the side surfaces of the multi-layer unit 16 via the bonding units 18.

The multi-layer unit 16 includes a capacitance forming unit 19 and covers 20.

The capacitance forming unit 19 includes a plurality of first internal electrodes 12 and a plurality of second internal electrodes 13. The first internal electrodes 12 and the second internal electrodes 13 are alternately disposed between the ceramic layers along the Z-axis direction. The first internal electrodes 12 are connected to the first external electrode 14 and are insulated from the second external electrode 15. The second internal electrodes 13 are connected to the second external electrode 15 and are insulated from the first external electrode 14.

The covers 20 cover the upper and lower surfaces of the capacitance forming unit 19 in the Z-axis direction. The covers 20 do not include the first internal electrodes 12 and the second internal electrodes 13.

In such a manner, in the body 11, except for both the end surfaces, which are oriented in the X-axis direction and to which the first external electrode 14 and the second external electrode 15 are provided, surfaces of the capacitance forming unit 19 are covered with the side margins 17 and the covers 20. The side margins 17 and the covers 20 have main functions of protecting the periphery of the capacitance forming unit 19 and ensuring insulation properties of the first internal electrodes 12 and the second internal electrodes 13.

The first internal electrodes 12 and the second internal electrodes 13 are each made of an electrical conductive material and function as internal electrodes of the multi-layer ceramic capacitor 10. Examples of the electrical conductive material include nickel (Ni), copper (Cu), palladium (Pd), platinum (Pt), silver (Ag), gold (Au), and a metal material including an alloy of them.

The capacitance forming unit 19 is made of ceramics. In the capacitance forming unit 19, in order to increase capacitances of the ceramic layers provided between the first internal electrodes 12 and the second internal electrodes 13, a material having a high dielectric constant is used as a material forming the ceramic layers. For the capacitance forming unit 19, polycrystal of a barium titanate ($BaTiO_3$) based material, i.e., polycrystal having a Perovskite structure containing barium (Ba) and titanium (Ti) can be used, for example.

Alternatively, the capacitance forming unit 19 may be made of polycrystal of a strontium titanate ($SrTiO_3$) based material, a calcium titanate ($CaTiO_3$) based material, a magnesium titanate ($MgTiO_3$) based material, a calcium zirconate ($CaZrO_3$) based material, a calcium zirconate titanate ($Ca(Zr,Ti)O_3$) based material, a barium zirconate ($BaZrO_3$) based material, a titanium oxide ($TiO_2$) based material, or the like.

The side margins 17 and the covers 20 are also made of ceramics. The material of the side margins 17 and the covers 20 may be insulating ceramics. However, use of ceramics including a composition system, which is common to a composition system of the capacitance forming unit 19, leads to suppression of internal stress in the body 11.

It should be noted that the side margins 17, the capacitance forming unit 19, and the covers 20 may contain a rare-earth element, silicon (Si), or an oxide of them, for example. The bonding units 18 will be described later.

With the configuration described above, when a voltage is applied between the first external electrode 14 and the second external electrode 15 in the multi-layer ceramic capacitor 10, a voltage is applied to the plurality of ceramic layers between the first internal electrodes 12 and the second internal electrodes 13. With this configuration, the multi-layer ceramic capacitor 10 stores charge corresponding to the voltage applied between the first external electrode 14 and the second external electrode 15.

It should be noted that the multi-layer ceramic capacitor 10 according to this embodiment only needs to include the side margins 17 and the bonding units 18, and other configurations can be changed as appropriate. For example, the number of first internal electrodes 12 and second internal electrodes 13 can be determined as appropriate in accordance with the size and performance expected for the multi-layer ceramic capacitor 10.

Further, in FIGS. 2 and 3, in order to make the facing state of the first and second internal electrodes 12 and 13 easily viewable, the number of first internal electrodes 12 and the number of second internal electrodes 13 are each set to four. However, actually, more first and second internal electrodes 12 and 13 are provided so as to ensure the capacitance of the multi-layer ceramic capacitor 10.

1.2. Bonding Unit 18

Figure 4:
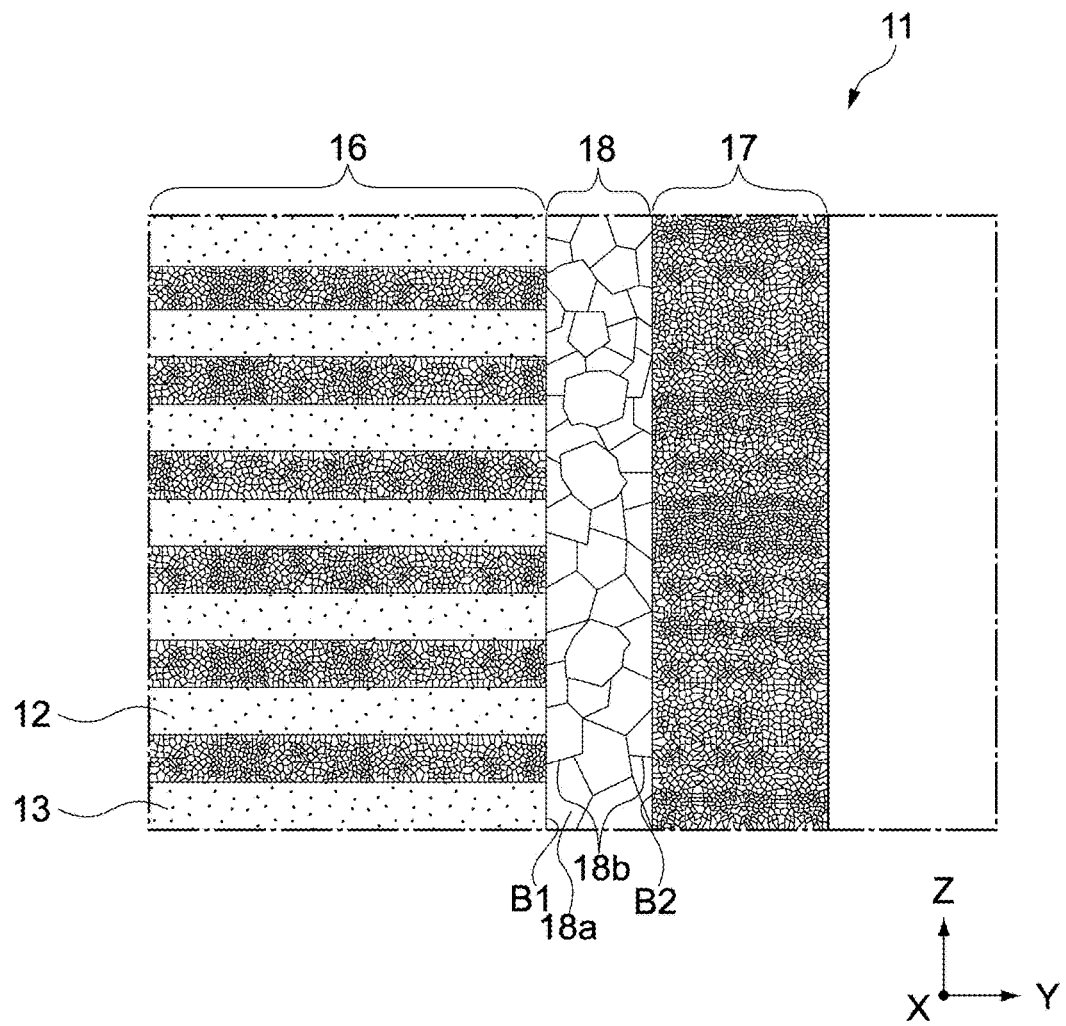
FIG. 4 is a schematic view of a microstructure of the multi-layer ceramic capacitor in an area P shown in FIG. 3.

FIG. 4 is a schematic view of a microstructure of the multi-layer ceramic capacitor 10 in an area P surrounded by a chain line of FIG. 3. A microstructure of a cross section of the multi-layer ceramic capacitor 10 can be observed with a scanning electron microscope (SEM), for example.

In the multi-layer ceramic capacitor 10 according to this embodiment, as shown in FIG. 4, the side margin 17 is bonded to the multi-layer unit 16 via the bonding unit 18.

The capacitance forming unit 19 of the multi-layer unit 16 has a structure in which the first internal electrodes 12 and the second internal electrodes 13 are laminated in the Z-axis direction via the ceramic layers made of substantially-uniform polycrystal of ceramics.

The side margins 17 each have a structure of substantially-uniform polycrystal of ceramics.

As shown in FIG. 4, the bonding unit 18 has a structure of polycrystal of ceramics containing crystal grains 18a. The crystal grains 18a have a grain diameter larger than the crystal grains of the ceramic layers of the multi-layer unit 16 and the side margins 17.

It should be noted that actually an interface B1 between the multi-layer unit 16 and the bonding unit 18 and an interface B2 between the side margin 17 and the bonding unit 18, which are shown in FIG. 4, are difficult to observe in some cases.

In other words, the bonding units 18 according to this embodiment are each made of ceramics having an average crystal grain diameter that is larger than an average crystal grain diameter of ceramics forming the ceramic layers of the multi-layer unit 16 and the side margins 17.

For example, the average crystal grain diameter of the ceramics forming the ceramic layers of the multi-layer unit 16 and the side margins 17 is several tens to several hundreds of nm, whereas the average crystal grain diameter of the ceramics forming the bonding units 18 is several μm.

It should be noted that the average crystal grain diameter of the ceramics forming the ceramic layers and the average crystal grain diameter of the ceramics forming the side margins 17 may be equal to or different from each other.

With this configuration, the number of crystal grains 18a being in contact with the multi-layer unit 16 and the side margin 17 is reduced in both the interfaces B1 and B2 of the bonding unit 18. In other words, the number of crystal grain boundaries 18b is reduced in both the interfaces B1 and B2 of the bonding unit 18. The crystal grain boundaries 18b are likely to be the origins from which cracks and peel-off of the multi-layer unit 16 and the side margin 17 are generated. Thus, a good bonding state between the multi-layer unit 16 and the side margin 17 is maintained via the bonding unit 18.

Further, in order to successfully maintain the form and performance of the multi-layer ceramic capacitor 10, the thickness of the bonding unit 18 is desirably 5 μm or less.

Further, the bonding unit 18 is desirably made of polycrystal of a composition system common to a composition system of the multi-layer unit 16 and the side margin 17.

In addition, in order to successfully obtain the above-mentioned action, the bonding unit 18 may include an element that is different from the multi-layer unit 16 and the side margin 17. For example, the bonding unit 18 may contain a rare-earth element, silicon (Si), or an oxide of them, for example.

In this embodiment, the multi-layer unit 16, the side margins 17, and the bonding units 18 may be different from one another in ratio of elements forming the main phase.

For example, when each of the multi-layer unit 16, the side margins 17, and the bonding units 18 is made of polycrystal of a barium titanate ($BaTiO_3$) based material, the ratio of barium (Ba), titanium (Ti), and oxygen (O) may be different between the multi-layer unit 16, the side margins 17, and the bonding units 18.

It should be noted that the average crystal grain diameter according to this embodiment is obtained as follows: a cross section of the multi-layer ceramic capacitor 10 is imaged at a predetermined magnification with the SEM to obtain an image, crystal grains having an arbitrary size are selected from the image, grain diameters thereof are measured, and an average value thereof is calculated.

Specifically, the multi-layer ceramic capacitor 10 is vertically embedded into an epoxy resin and grinded to the center portion of the chip. Next, a cross section of the multi-layer unit 16, the side margin 17, and the bonding unit 18 in the vicinity of the middle of the lamination direction is imaged at three spots at a 10,000× magnification to obtain images, and 15 or more crystal grains are selected from the images. Grain diameters of the selected crystal grains are then measured by an image analysis, and an average value thereof is calculated, so that an average crystal grain diameter is obtained.

1.3 Method of Producing Multi-layer Ceramic Capacitor 10

Figure 5:
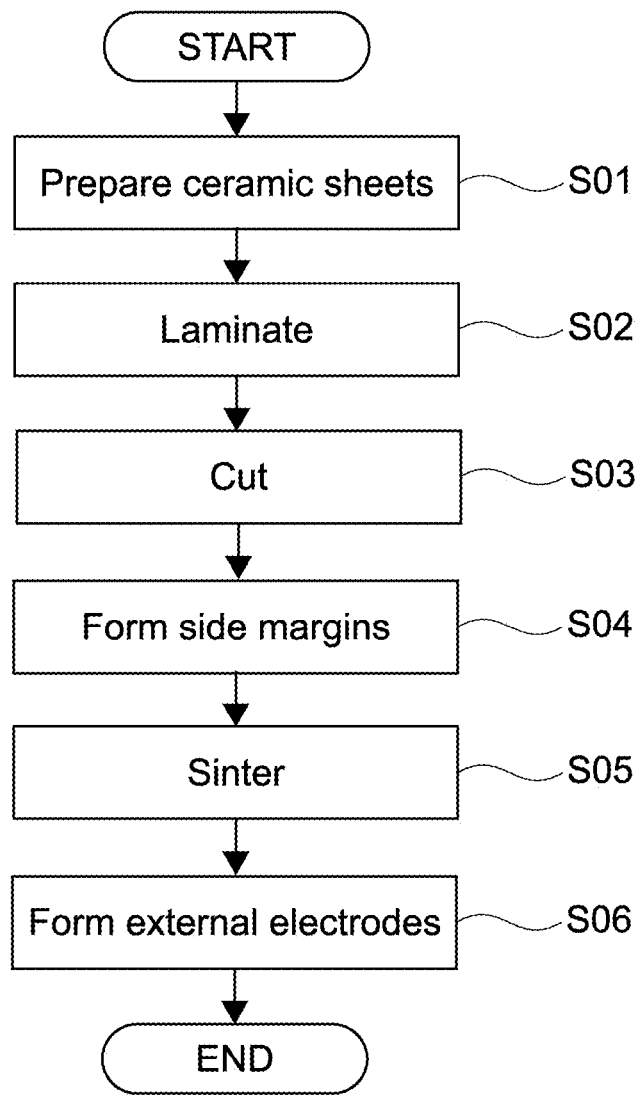
FIG. 5 is a flowchart showing a method of producing the multi-layer ceramic capacitor.

FIG. 5 is a flowchart showing a method of producing the multi-layer ceramic capacitor 10. FIGS. 6A to 10 are views each showing a production process of the multi-layer ceramic capacitor 10. Hereinafter, the method of producing the multi-layer ceramic capacitor 10 will be described along FIG. 5 with reference to FIGS. 6A to 10 as appropriate.

1.3.1 Step S01: Preparation of Ceramic Sheets

In Step S01, first ceramic sheets 101 and second ceramic sheets 102 for forming the capacitance forming unit 19, and third ceramic sheets 103 for forming the covers 20 are prepared. The first, second, and third ceramic sheets 101, 102, and 103 are configured as unsintered dielectric green sheets and formed into sheets by using a roll coater or a doctor blade, for example.

Figures 6A, 6B, 6C:
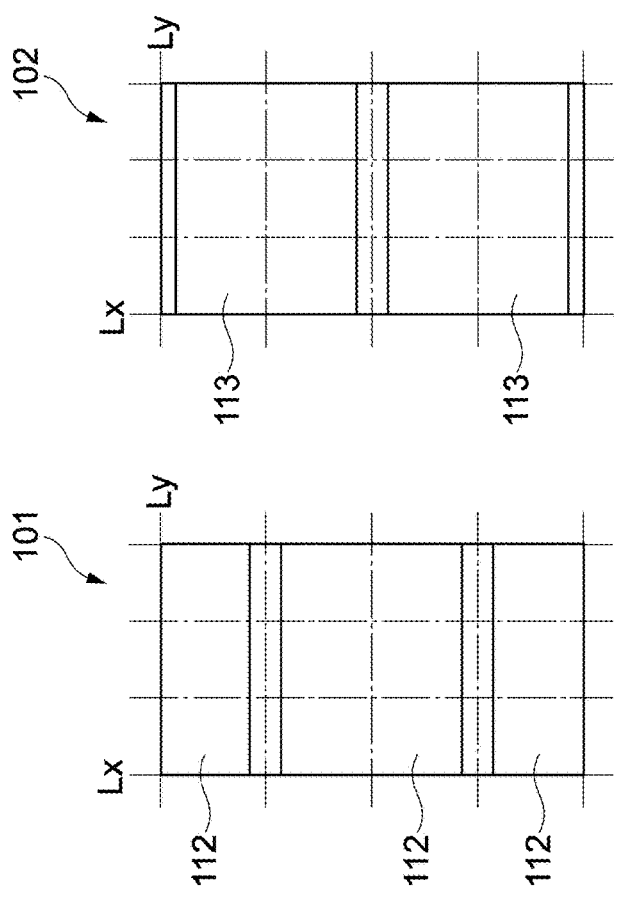
FIG. 6A is a plan view showing a production process of the multi-layer ceramic capacitor.
FIG. 6B is a plan view showing a production process of the multi-layer ceramic capacitor.
FIG. 6C is a plan view showing a production process of the multi-layer ceramic capacitor.

FIGS. 6A, 6B, and 6C are plan views of the first, second, and third ceramic sheets 101, 102, and 103, respectively. At this stage, the first, second, and third ceramic sheets 101, 102, and 103 are not yet cut into the multi-layer ceramic capacitors 10. FIGS. 6A, 6B, and 6C each show cutting lines Lx and Ly used when the sheets are cut into the multi-layer ceramic capacitors 10. The cutting lines Lx are parallel to the X axis, and the cutting lines Ly are parallel to the Y axis.

As shown in FIGS. 6A, 6B, and 6C, unsintered first internal electrodes 112 corresponding to the first internal electrodes 12 are formed on the first ceramic sheet 101, and unsintered second internal electrodes 113 corresponding to the second internal electrodes 13 are formed on the second ceramic sheet 102. It should be noted that no internal electrodes are formed on the third ceramic sheet 103 corresponding to the cover 20.

The first and second internal electrodes 112 and 113 can be formed using any electrical conductive paste. For formation of the first and second internal electrodes 112 and 113 by use of an electrical conductive paste, a screen printing method or a gravure printing method can be used, for example.

Each of the first and second internal electrodes 112 and 113 is disposed over two areas and extends like a belt in the Y-axis direction. The two areas are adjacent to each other in the X-axis direction and divided by the cutting line Ly. The first internal electrodes 112 are shifted from the second internal electrodes 113 in the X-axis direction by one row including the areas divided by the cutting lines Ly. In other words, the cutting line Ly passing through the center of the first internal electrode 112 passes through an area between the second internal electrodes 113, and the cutting line Ly passing through the center of the second internal electrode 113 passes through an area between the first internal electrodes 112.

1.3.2 Step S02: Lamination

In Step S02, the first, second, and third ceramic sheets 101, 102, and 103 prepared in Step S01 are laminated, to produce a multi-layer sheet 104.

Figure 7:
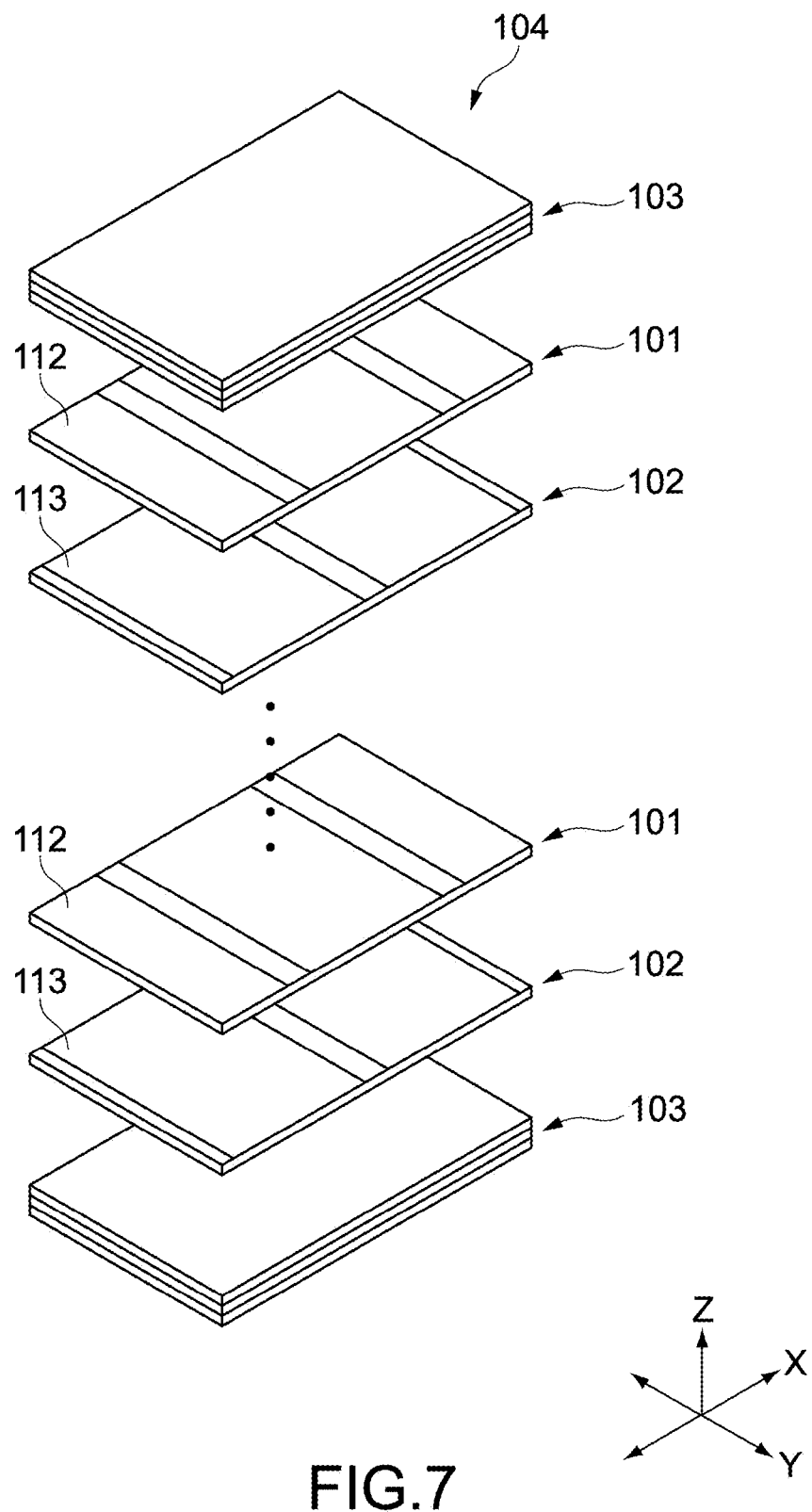
FIG. 7 is an exploded perspective view showing the production process of the multi-layer ceramic capacitor.

FIG. 7 is an exploded perspective view of the multi-layer sheet 104 obtained in Step S02. For the purpose of description, FIG. 7 shows the first, second, and third ceramic sheets 101, 102, and 103 in an exploded manner. In an actual multi-layer sheet 104, however, the first, second, and third ceramic sheets 101, 102, and 103 are pressure-bonded by hydrostatic pressing, uniaxial pressing, or the like for integration. With this configuration, a high-density multi-layer sheet 104 is obtained.

In the multi-layer sheet 104, the first ceramic sheets 101 and the second ceramic sheets 102 that correspond to the capacitance forming unit 19 are alternately laminated in the Z-axis direction.

Further, in the multi-layer sheet 104, the third ceramic sheets 103 corresponding to the covers 20 are laminated on the uppermost and lowermost surfaces of the first and second ceramic sheets 101 and 102 alternately laminated in the Z-axis direction. It should be noted that in the example shown in FIG. 7, three third ceramic sheets 103 are laminated on each of the uppermost and lowermost surfaces of the laminated first and second ceramic sheets 101 and 102, but the number of third ceramic sheets 103 can be changed as appropriate.

1.3.3 Step S03: Cutting

In Step S03, the multi-layer sheet 104 obtained in Step S02 is cut with a rotary blade, a push-cutting blade, or the like, to produce unsintered multi-layer chips 116.

Figure 8:
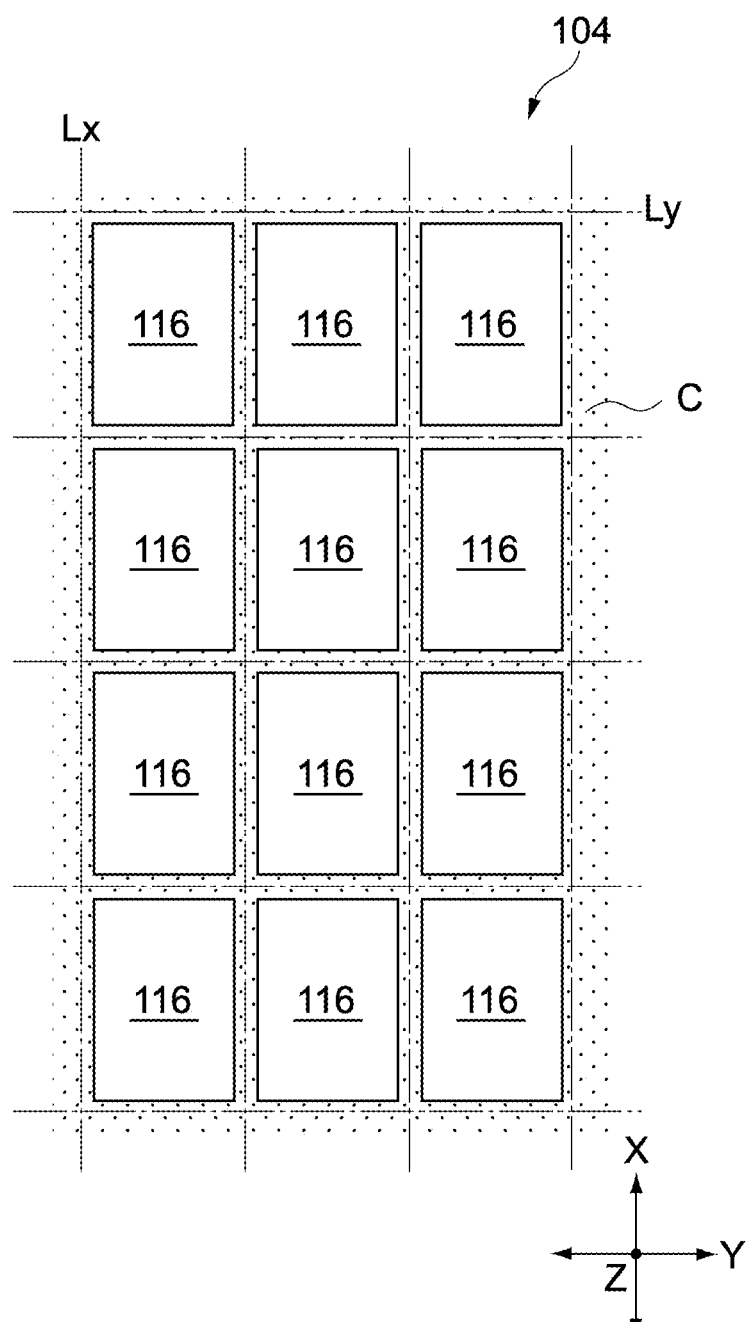
FIG. 8 is a plan view showing the production process of the multi-layer ceramic capacitor.

FIG. 8 is a plan view of the multi-layer sheet 104 after Step S03. The multi-layer sheet 104 is cut along the cutting lines Lx and Ly while being fixed to a holding member C. With this configuration, the multi-layer sheet 104 is singulated, so that the multi-layer chips 116 are obtained. At that time, the holding member C is not cut, and thus the multi-layer chips 116 are connected via the holding member C.

Figure 9:
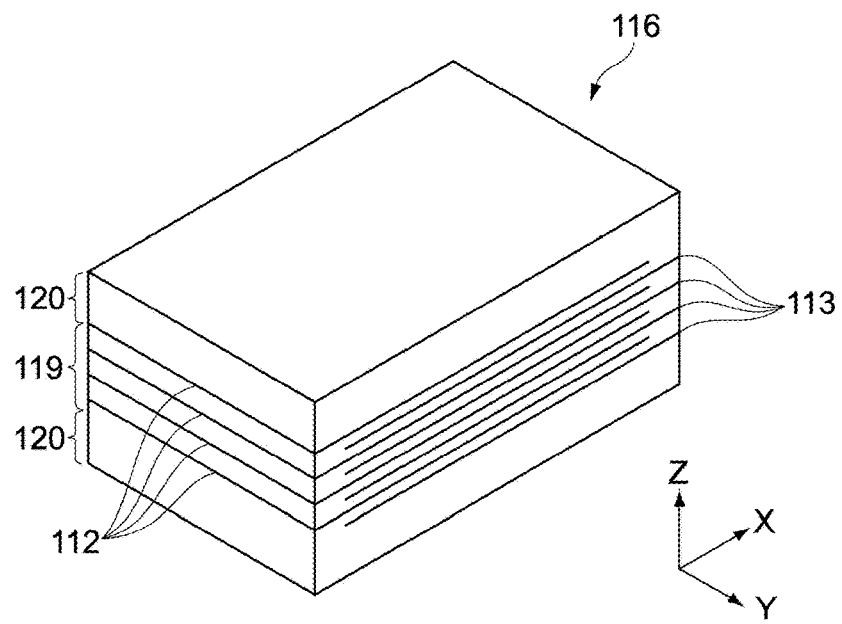
FIG. 9 is a perspective view showing the production process of the multi-layer ceramic capacitor.

FIG. 9 is a perspective view of the multi-layer chip 116 obtained in Step S03. The multi-layer chip 116 includes a capacitance forming unit 119 and covers 120 that are unsintered. In the multi-layer chip 116, the unsintered first and second internal electrodes 112 and 113 are exposed to the cut surfaces, i.e., both the side surfaces oriented in the Y-axis direction.

1.3.4 Step S04: Formation of Side Margins

In Step S04, unsintered side margins 117 and bonding units 118 are provided to the multi-layer chip 116 obtained in Step S03, to produce an unsintered body 111.

In Step S04, in order to provide the side margins 117 and the bonding units 118 to both the side surfaces of the multi-layer chip 116, the orientation of the multi-layer chip 116 is changed as appropriate by replacement of a holding member such as a tape, for example.

In particular, in Step S04, the side margins 117 and the bonding units 118 are provided to both the side surfaces of the multi-layer chip 116 that are oriented in the Y-axis direction, both the side surfaces being the cut surfaces of the multi-layer chip 116 in Step S03. For that reason, in Step S04, it is desirable to previously detach the multi-layer chips 116 from the holding member C and rotate the multi-layer chips 116 by 90 degrees.

Figure 10:
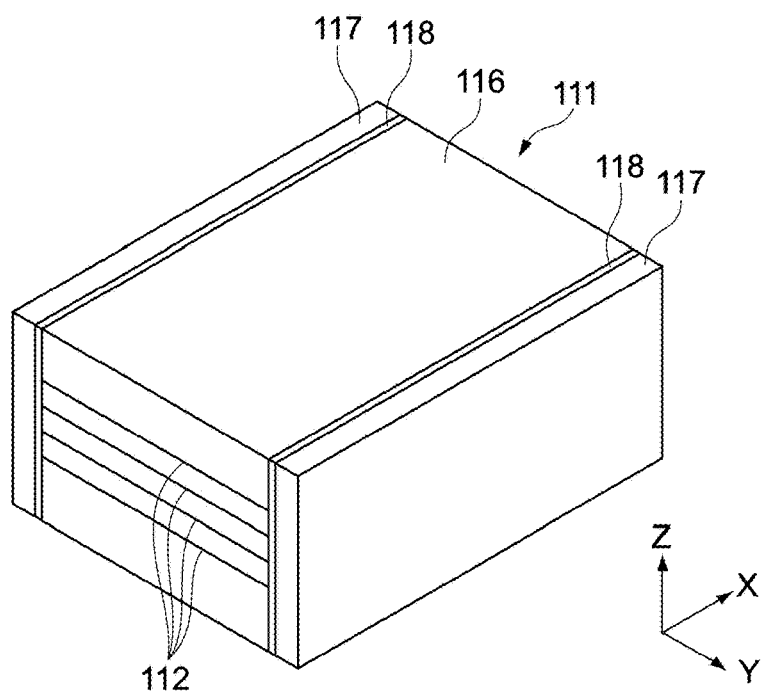
FIG. 10 is a perspective view showing the production process of the multi-layer ceramic capacitor.

FIG. 10 is a perspective view of the unsintered body 111 obtained in Step S04.

The side margins 117 are prepared as sheets having a composition similar to the first, second, and third ceramic sheets 101, 102, and 103 and having a predetermined thickness. The composition of the first, second, and third ceramic sheets 101, 102, and 103 is determined as a charging composition of predetermined ceramics.

The bonding units 118 are prepared as sheets having a predetermined thickness. The side margins 117 are attached to the side surfaces of the multi-layer chip 116 via the bonding units 118.

In Step S04, for example, after the bonding unit 118 is attached to the side surface of the multi-layer chip 116, the side margin 117 can be attached to the bonding unit 118. Alternatively, for example, the side margin 117 and the bonding unit 118 may be attached to each other on a polyethylene terephthalate (PET) film and then integrally attached to the side surface of the multi-layer chip 116.

Alternatively, in Step S04, the side margins 117 and the bonding units 118 may not be formed into sheets, but be formed by application or dipping to coat the side surfaces of the multi-layer chip 116. In other words, the side surfaces of the multi-layer chip 116 may be coated with the bonding units 118, and then the bonding units 118 may be coated with the side margins 117.

Alternatively, in Step S04, in combination with those above methods, the side surfaces of the multi-layer chip 116 may be coated with the bonding units 118, and then sheet-like side margins 117 may be attached to the bonding units 118, for example. Alternatively, sheet-like bonding units 118 may be attached to the side surfaces of the multi-layer chip 116 and then coated with the side margins 117.

The side surfaces of the multi-layer chip 116, on which the side margins 117 and the bonding units 118 are provided, receive a pressing force from the side margins 117 and the bonding units 118. Thus, peel-off of the ceramic layers easily occurs. As a result, in Step S04, it is desirable to not perform processing for achieving high density, such as hydrostatic pressing and uniaxial pressing, on the unsintered body 111.

1.3.5 Step S05: Sintering

In Step S05, the unsintered body 111 obtained in Step S04 is sintered to produce the body 11 of the multi-layer ceramic capacitor 10 shown in FIGS. 1 to 3. In other words, in Step S05, the multi-layer chip 116 becomes the multi-layer unit 16, the side margins 117 become the side margins 17, and the bonding units 118 become the bonding units 18.

A sintering temperature for the body 111 in Step S05 can be determined on the basis of a sintering temperature for the multi-layer chip 116 and the side margins 117. For example, when a barium titanate ($BaTiO_3$) based material is used as the ceramics, the sintering temperature for the body 111 can be set to approximately 1,000 to 1,300° C. Further, sintering can be performed in a reduction atmosphere or a low-oxygen partial pressure atmosphere, for example.

Here, it is assumed that the shrinkage behaviors of the multi-layer chip 116 and the side margins 117 at the sintering are perfectly matched with each other. In this case, if the side margins 117 are directly provided to the multi-layer chip 116 without providing the bonding units 118, there is a high possibility that high bonding properties of the side margins 117 to the multi-layer chip 116 is obtained.

In this regard, both of the multi-layer chip 116 and the side margins 117 are made of similar ceramics such that the shrinkage behaviors thereof at the sintering do not largely differ.

However, in general, it is difficult to perfectly match the shrinkage behaviors at the sintering of the multi-layer chip 116 and the side margins 117. In other words, the multi-layer chip 116 and the side margins 117 inevitably have a slight difference in timing of shrinkage or in amount of shrinkage at the sintering.

This has caused generation of cracks, peel-off of the multi-layer unit and the side margins, and the like in the multi-layer ceramic capacitor of the related art, and made it difficult to ensure bonding properties of the side margins and the multi-layer unit.

A main cause of a difference in shrinkage behavior at the sintering between the multi-layer chip 116 and the side margins 117 is a difference in density between the multi-layer chip 116 and the side margins 117.

In other words, as described above, the multi-layer chip 116 achieves high density in the lamination step of Step S02, whereas the body 111 including the side margins 117 and the bonding units 118 do not achieve high density in Step S04. As a result, the side margins 117 have a lower density than the multi-layer chip 116.

With this configuration, the multi-layer chip 116 and the side margins 117 have a difference in rate of temperature increase and also a difference in timing of shrinkage. Further, since the side margins 117 include more pores than the multi-layer chip 116, the multi-layer chip 116 and the side margins 117 have a difference in amount of shrinkage.

Further, another cause of a difference in shrinkage behavior at the sintering between the multi-layer chip 116 and the side margins 117 is the presence or absence of the first and second internal electrodes 112 and 113.

In other words, the multi-layer chip 116 includes the first and second internal electrodes 112 and 113, whereas the side margins 117 include no internal electrodes. In the multi-layer chip 116, the ceramic layers and the first and second internal electrodes 112 and 113 are sintered at the same time. Thus, the multi-layer chip 116 has a shrinkage behavior different from a shrinkage behavior of the side margins 117 including no internal electrodes.

In addition, still another cause of a difference in shrinkage behavior at the sintering between the multi-layer chip 116 and the side margins 117 is a difference in composition.

In other words, for example, in order to increase a mechanical strength, the side margins 117 may have a composition different from a composition of the multi-layer chip 116. More specifically, an element that is not contained in the multi-layer chip 116 may be added to the side margins 117, or a composition ratio that is different from a composition ratio of the multi-layer chip 116 may be provided to the side margins 117. In such a case, the multi-layer chip 116 and the side margins 117 have a difference in sintering temperature for the ceramics, and thus have a difference in shrinkage behavior at the sintering.

In this embodiment, in order to reduce the difference in shrinkage behavior at the sintering, which is caused between the multi-layer chip 116 and the side margins 117 as described above, the bonding units 118 are provided between the multi-layer chip 116 and the side margins 117.

Here, the bonding units 118 according to this embodiment are made of ceramics having an average particle diameter that is smaller than an average particle diameter of the ceramics forming the multi-layer chip 116 and the side margins 117.

For example, the average particle diameter of the ceramics forming the multi-layer chip 116 and the side margins 117 is several hundreds of nm, whereas the average particle diameter of the ceramics forming the bonding units 118 is several tens of μm.

With this configuration, particles of the ceramics forming the bonding units 118 are easy to enter pores or the like of the ceramics forming the ceramic layers of the multi-layer chip 116 and the side margins 117.

Thus, in the unsintered body 111, adhesion between the multi-layer chip 116 and the side margins 117 via the bonding units 118 is improved.

Further, the bonding units 118 are made of ceramics having a small average particle diameter, and are thus flexibly deformable.

Thus, the bonding units 118 are freely deformable in accordance with the shrinkage behaviors of the multi-layer chip 116 and the side margins 117. As a result, even when the multi-layer chip 116 and the side margins 117 have a difference in level of shrinkage at the sintering, the multi-layer chip 116 and the side margins 117 do not apply stress mutually.

Thus, cracks and peel-off of the multi-layer unit 16 and the side margins 17 can be inhibited from occurring in both the interfaces B1 and B2 of the sintered bonding units 18.

In particular, the multi-layer chip 116, the side margins 117, and the bonding units 118 are desirably made of green sheet containing base powder having a common composition system. With this configuration, when the unsintered body 111 is sintered, the shrinkage behaviors of the multi-layer chip 116, the side margins 117, and the bonding units 118 are made uniform, and generation of cracks and peel-off can be more effectively inhibited from occurring.

Further, since the bonding units 118 are flexibly deformable, even when the multi-layer chip 116 and the side margins 117 have some asperities, the bonding units 118 can be deformed by following the asperities. This can improve adhesion between the multi-layer unit 16 and the side margins 17 via the bonding units 18 in the sintered body 11.

Furthermore, since the average particle diameter of the ceramics forming the bonding units 118 is smaller than the average particle diameter of the ceramics forming the ceramic layers of the multi-layer chip 116 and the side margins 117, the particles of the bonding units 118 have lower thermal stability than the particles of the ceramic layers and the side margins 117. Thus, grain growth is easily caused.

With this configuration, as shown in FIG. 4, in the sintered body 11, the average crystal grain diameter of the ceramics forming the bonding units 18 is larger than the average crystal grain diameter of the ceramics forming the ceramic layers of the multi-layer unit 16 and the side margins 17. Thus, the action and effect described above can be obtained.

In such a manner, sintering is completed while the multi-layer chip 116 and the side margins 117 mutually maintain good connection through the bonding units 118. Further, high bonding properties of the side margins 17 to the multi-layer unit 16 are obtained in the sintered body 11.

Furthermore, at the sintering, the pores of the bonding units 118 are filled with particles enlarged by the grain growth. Thus, the sintered bonding units 18 have a structure with a small amount of pores. With this configuration, the multi-layer ceramic capacitor 10 obtains high moisture resistance.

Moreover, when the thickness of the bonding units 118 according to this embodiment is large, accessory components such as silicon (Si) contained in the bonding units 118 are easy to diffuse to the multi-layer chip 116. This reduces a capacitance in each layer of the multi-layer chip 116.

From the above viewpoints, it is desirable that the thickness of the bonding unit 118 be sufficiently thin. Specifically, it is desirable to set the thickness of the sintered bonding unit 18 to be 5 μm or less.

1.3.6 Step S06: Formation of External Electrodes

In Step S06, the first external electrode 14 and the second external electrode 15 are formed on the body 11 obtained in Step S05, to produce the multi-layer ceramic capacitor 10 shown in FIGS. 1 to 3.

In Step S06, first, an unsintered electrode material is applied so as to cover one of the end surfaces of the body 11 and then applied so as to cover the other one of the end surfaces of the body 11, the end surfaces being oriented in the X-axis direction. The applied unsintered electrode materials are subjected to baking in a reduction atmosphere or a low-oxygen partial pressure atmosphere, for example, to form base films on the body 11. On the base films baked onto the body 11, intermediate films and surface films are formed by plating such as electrolytic plating. Thus, the first external electrode 14 and the second external electrode 15 are completed.

It should be noted that part of the processing in Step S06 described above may be performed before Step S05. For example, before Step S05, the unsintered electrode material may be applied to both the end surfaces of the unsintered body 111 that are oriented in the X-axis direction, and in Step S05, the unsintered body 111 may be sintered and, simultaneously, the unsintered electrode material may be baked to form base films of the first external electrode 14 and the second external electrode 15.

2. Second Embodiment

A second embodiment of the present invention will be described. Hereinafter, configurations similar to those of the first embodiment will be denoted by similar symbols, and detailed description thereof will be omitted.

In the first embodiment, the unsintered body 111 is produced by attaching the sheet-shaped bonding units 118 and side margins 117 to the unsintered multi-layer chip 116. As a result, as shown in FIG. 10, the unsintered body 111 includes ridge lines (where two different surfaces intersect with each other) and corners (where three different surfaces intersect with one another). The ridge lines and the corners connect the surfaces of the body 111 to one another.

When the body 111 includes the ridge lines and the corners, due to collision of the bodies 111 with one another in the production process, chipping or cracking is generated in the bodies 111. Thus, in order to suppress generation of such chipping or cracking, the ridge lines and the corners of the body 111 are chamfered.

For a processing method of chamfering the ridge lines and the corners of the body 111, barrel polishing is effective in terms of improvement in production efficiency. The barrel polishing can be executed by, for example, putting the unsintered bodies 111, a polishing medium, and liquid into a barrel container and imparting rotational motions or vibrations to the barrel container.

Figure 11:
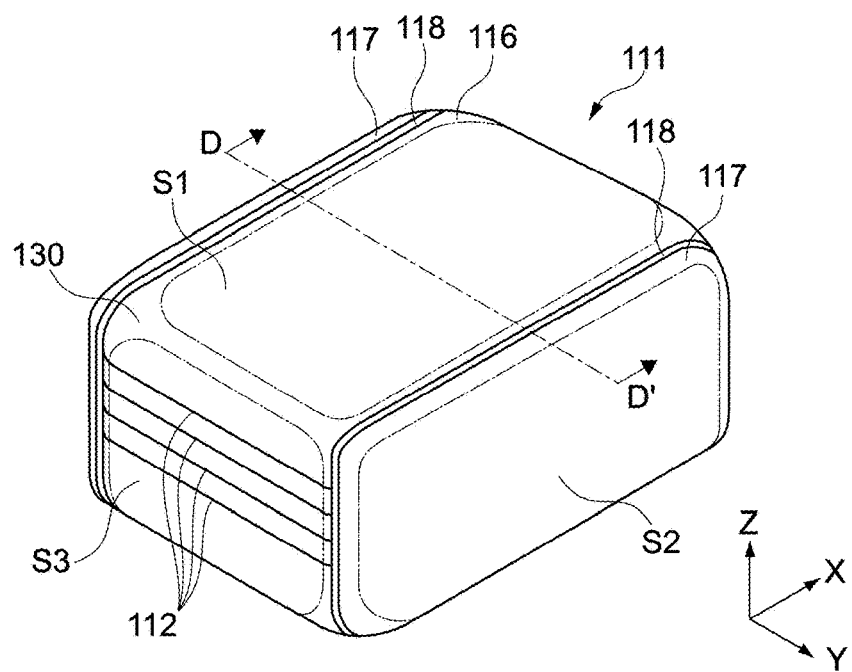
FIG. 11 is a perspective view of an unsintered body after being subjected to barrel polishing according to a second embodiment of the present invention.
Figure 12:
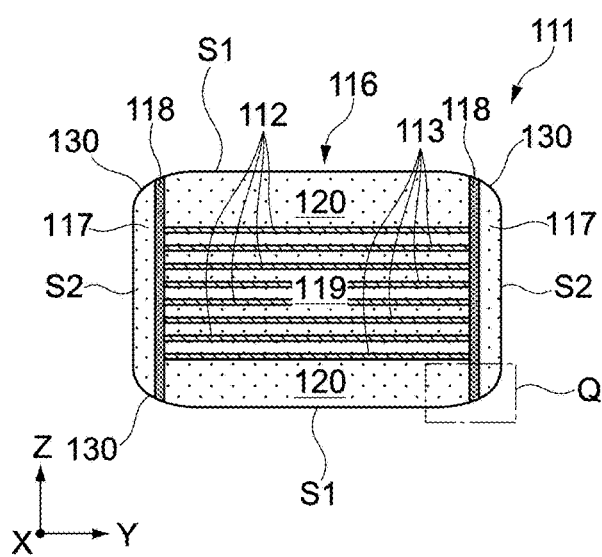
FIG. 12 is a cross-sectional view of the body taken along the D-D' line in FIG. 11.
Figure 13:
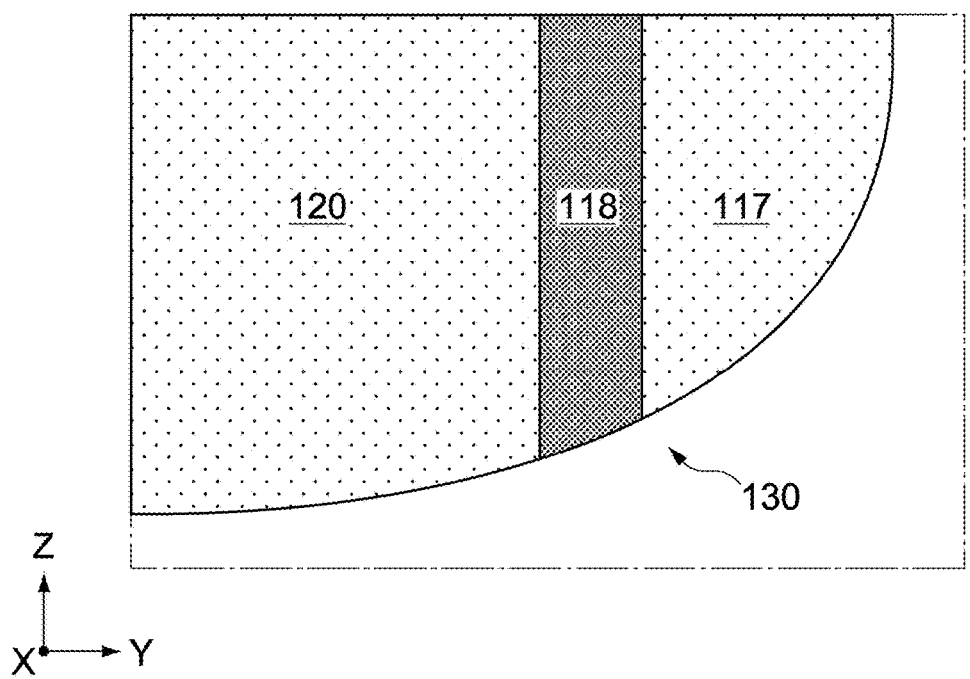
FIG. 13 is a schematic enlarged view of an area Q of the body shown in FIG. 12.

FIG. 11 is a perspective view of the unsintered body 111 after being subjected to the barrel polishing according to the second embodiment. FIG. 12 is a cross-sectional view of the unsintered body 111 taken along the D-D' line in FIG. 11. FIG. 13 is a schematic enlarged view of an area Q in FIG. 12.

The ridge lines and the corners of the body 111 are chamfered by the barrel polishing, and thus the body 111 has ridges 130 as shown in FIGS. 11 and 12. As shown in FIG. 11, the ridges 130 are connected to two main surfaces S1 oriented in the Z-axis direction, two side surfaces S2 oriented in the Y-axis direction, and two end surfaces S3 oriented in the X-axis direction. Further, as shown in FIG. 13, each of the ridges 130 is a curved surface chamfered continuously over the side margin 117, the bonding unit 118, and the cover 120 (the multi-layer chip 116).

Incidentally, in general, when ridge lines and corners of an unsintered body including a multi-layer chip and side margins attached to the multi-layer chip are chamfered by barrel polishing or the like, cracks, delamination, and the like are easy to occur between the multi-layer chip and the side margins.

Meanwhile, the unsintered body 111 according to this embodiment includes the bonding units 118 each disposed between the multi-layer chip 116 and the side margin 117. Here, the bonding units 118 are made of ceramics having an average particle diameter that is smaller than an average particle diameter of ceramics forming the multi-layer chip 116 and the side margins 117.

With this configuration, particles of the ceramics forming the bonding units 118 are easy to enter pores or the like of the ceramics forming the ceramic layers of the multi-layer chip 116 and the side margins 117. Thus, in the unsintered body 111, adhesion between the multi-layer chip 116 and the side margins 117 via the bonding units 118 is improved.

Thus, even when the ridge lines and the corners of the unsintered body 111 are chamfered by the barrel polishing, cracks, delamination, and the like are inhibited from occurring in both of the interface between the bonding unit 118 and the side margin 117 and the interface between the bonding unit 118 and the multi-layer chip 116.

A method of forming the ridges 130 is not limited to the method of performing the barrel polishing on the unsintered body 111. The ridges 130 may be formed by performing the barrel polishing on the sintered body 11.

Also in this case, in the unsintered body 111, since adhesion between the multi-layer chip 116 and the side margins 117 via the bonding units 118 is improved, also in the sintered body 11, adhesion between the multi-layer unit 16 and the bonding units 18 and between the bonding units 18 and the side margins 17 are improved.

Therefore, even when the sintered body 11 is subjected to the barrel polishing, cracks, delamination, and the like are inhibited from occurring in the interface B1 between the multi-layer unit 16 and the bonding unit 18 and the interface B2 between the bonding unit 18 and the side margin 17.

3. Other Embodiments

While the embodiment of the present invention has been described, the present invention is not limited to the embodiment described above, and it should be appreciated that the present invention may be variously modified.

For example, in the multi-layer ceramic capacitor 10, the capacitance forming unit 19 may be divided into capacitance forming units in the Z-axis direction. In this case, in each capacitance forming unit 19, the first internal electrodes 12 and the second internal electrodes 13 only need to be alternately disposed along the Z-axis direction. In a portion where the capacitance forming units 19 are next to each other, the first internal electrodes 12 or the second internal electrodes 13 may be continuously disposed.

What is claimed is:

1. A multi-layer ceramic capacitor, comprising:
   a multi-layer unit including
      ceramic layers that are made of first ceramics and laminated in a first direction, the first ceramics having a first average crystal grain diameter, and internal electrodes disposed between the ceramic layers;

a side margin that is made of second ceramics and covers the multi-layer unit from a second direction orthogonal to the first direction, the second ceramics having a second average crystal grain diameter; and a bonding unit that is made of third ceramics and disposed between the multi-layer unit and the side margin, the third ceramics having a third average crystal grain diameter that is larger than the first average crystal grain diameter and the second average crystal grain diameter, the third ceramics including an element that is not added to the first and the second ceramics.

2. The multi-layer ceramic capacitor according to claim 1, wherein
the element includes a rare-earth element or silicon (Si).

3. A multi-layer ceramic capacitor, comprising:
a multi-layer unit including
ceramic layers that are made of first ceramics and laminated in a first direction, the first ceramics having a first average crystal grain diameter, and
internal electrodes disposed between the ceramic layers;

a side margin that is made of second ceramics and covers the multi-layer unit from a second direction orthogonal to the first direction, the second ceramics having a second average crystal grain diameter; and a bonding unit that is made of third ceramics and disposed between the multi-layer unit and the side margin, the third ceramics having a third average crystal grain diameter that is larger than the first average crystal grain diameter and the second average crystal grain diameter, the first, the second, and the third ceramics including a main phase made of polycrystal of a barium titanate ($BaTiO_3$) based material, the third ceramics being different from the first and the second ceramics in a ratio of barium (Ba), titanium (Ti), and oxygen (O) contained in the main phase.

* * * * *